United States

[11] 3,532,037

| | | |
|---|---|---|
| [72] | Inventors | Michel Aupnan<br>Neuilly;<br>Jean Perilhou, Bourg-la-Reine,<br>France |
| [21] | Appl. No. | 869,398 |
| [22] | Filed | Oct. 24, 1969<br>Continuation of Ser. No. 616,944, Feb. 17, 1967 |
| [45] | Patented | Oct. 6, 1970 |
| [73] | Assignee | By mesne assignments, to,<br>U.S. Philips Corporation<br>New York, New York<br>a corporation of Delaware. |
| [32] | Priority | Feb. 18, 1966 |
| [33] | | France |
| [31] | | 50,168 |

[54] SCANNING DEVICE FOR A CAMERA
3 Claims, 5 Drawing Figs.

[52] U.S. Cl. .................................................. 95/11,
128/6, 350/7
[51] Int. Cl. ........................................................ G03b 17/48
[50] Field of Search ......................................... 95/11,
11(HC), 11(EM, BS); 128/4, 6, 7, 8, 9, 11;
350/7, 52

[56] References Cited
UNITED STATES PATENTS

| 2,764,149 | 9/1956 | Sheldon | 128/6 |
| 2,894,436 | 7/1959 | Eber et al. | 95/11 |
| 3,023,662 | 3/1962 | Hicks | 350/7 |
| 3,329,074 | 7/1967 | Gosselin | 95/11 |

*Primary Examiner*—Norton Ansher
*Assistant Examiner*—Fred L. Braun
*Attorney*—Frank R. Trifari ABSTRACT: A device for scanning a surface, particularly the inner surface of a hollow body, for a camera including a light-conductor for transmitting a light beam to first and second light deflectors rotatable about the axis of the light beam. The first light deflector has a deflection angle of less than 45° and transmits the light beam to the second deflector which includes a reflecting element for totally reflecting the light beam. Both light deflectors are rotated by motors, the first having a hollow shaft for accommodating the light conductor.

Patented Oct. 6, 1970
3,532,037
Sheet 1 of 3
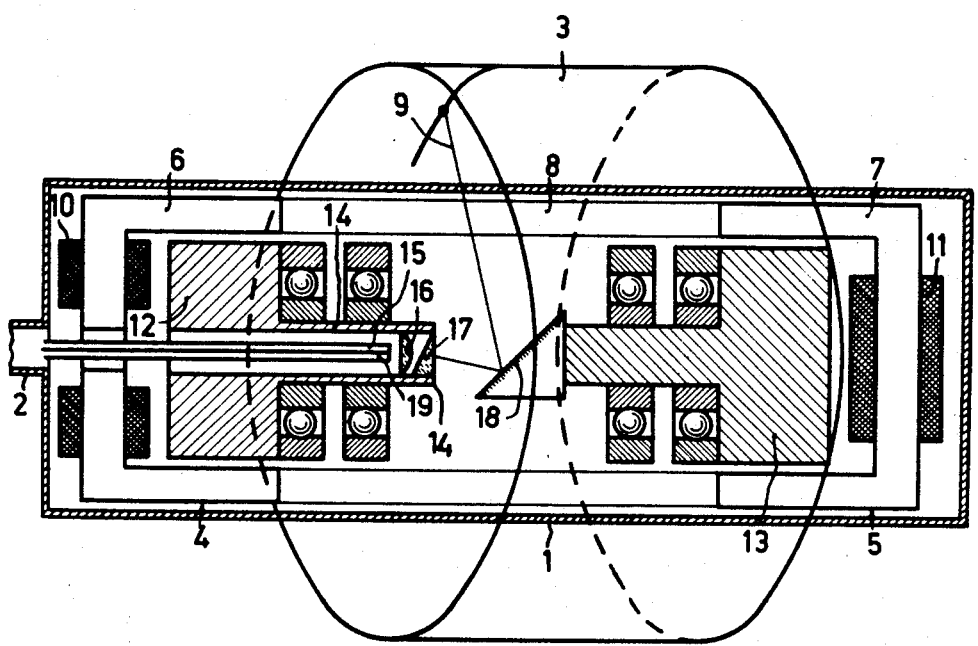
FIG.1
INVENTORS
MICHEL AUPHAN
BY JEAN PERILHOU
AGENT

SCANNING DEVICE FOR A CAMERA

This application is a continuation of U.S. Ser. No. 616,944, filed Feb. 17, 1967, now abandoned.

The invention relates to a scanning device for a camera which is particularly suitable for endoscopy.

In certain cases, cavities may be considered to be parts of cylinders. The problem to investigate these cavities optically is more difficult according as the dimensions of the cavity are smaller.

This is the case in particular in the medical endoscopy; the cavity to be investigated may be, for example, the esophagus, the trachea, and so on, and the importance of a good investigation hereof is obvious.

The commonly used known endoscopes transmit pictures which are supplied by an objective. Such devices which, like photography or television, that are suitable for the investigation of flat surfaces seem to be hardly suitable for a good investigation of cavities.

In the endoscope described in French Pat. No. 1,108,741 the surface to be investigated is illuminated, for example, by a conical light beam and the reflected light is received by a rotating mirror which scans the surface to be investigated and concentrates the reflected light onto the photocathode of a television camera tube in order to convert the picture inside the body into electric video signals. These signals are transmitted outside the body where said signals can again be converted into a corresponding image. Since the dimensions of the endoscope must be very small, this involves an extreme miniaturisation of the television camera tube which, as will be obvious, is very difficult to realize.

In French Pat. No. 1,406,609 a camera has already been proposed, in particular for endoscopy, which enables the use of an optical-mechanical scanning in the form of a spiral during the investigation of cavities. The light from a light source which is arranged outside the body is applied through light conductors, for which the name fibre optics is used, and the reflected light to be investigated is transmitted by the same fibre optics to the photocathode of a photomultiplier arranged outside the body. The scanning device described in the above patent comprises two deflection elements having small deflections, for example, prisms, which rotate in the same direction at constant speeds but with a small difference in speed, the drive of the two deflection elements being effected by the same ball race, the balls of which cooperate with conical bearing surfaces. The ratio of the speeds of the two deflection elements is in particular dependent upon the angles between the tangents in the points of contacts of the balls and the bearing surfaces and the rotating axis.

Such a device which is of particular importance for the investigation of the bottom of cavities (for example, the investigation of the wall of the stomach) is unsuitable for the investigation of the side walls of a narrow cylindrical cavity.

It is the object of the invention to mitigate the said drawbacks and the invention provides a new scanning device which may be used in particular in a camera for endoscopy of the type described in the said patent.

The invention relates to a scanning device for a camera, in particular for an endoscope, which supplies a narrow light beam which scans the surface to be investigated and comprises two deflection elements for the light beam which elements are capable of rotation. According to the invention the first deflection element, viewed in the direction of propagation of the entering light beam, which element is capable of rotation about the axis of the entering light beam has a deflection angle of less than 45° and the second deflection element, which is a reflecting element the reflecting side of which is located beside the first deflection element, has a deflection angle for the central ray of the narrow light beam between 60 and 120°.

The invention may moreover be characterized in that the first deflection element is a prism which is secured to one extremity of the hollow rotor shaft of a first motor and the said reflecting element is a flat mirror which is secured to one extremity of the rotor shaft of a second motor, co-axially with the first, the two said extremities of the shafts being located opposite to one another, the optical axis of the mirror enclosing an angle with the shaft of the second motor.

In order that the invention may be readily carried into effect one embodiment of a device according to the invention will now be described in greater detail, by way of example, with reference to the accompanying drawings, in which:

FIG. 1 shows the scanning device according to the invention in which the scanned portion of a curved surface is shown in a perspective view;

Figure 2:
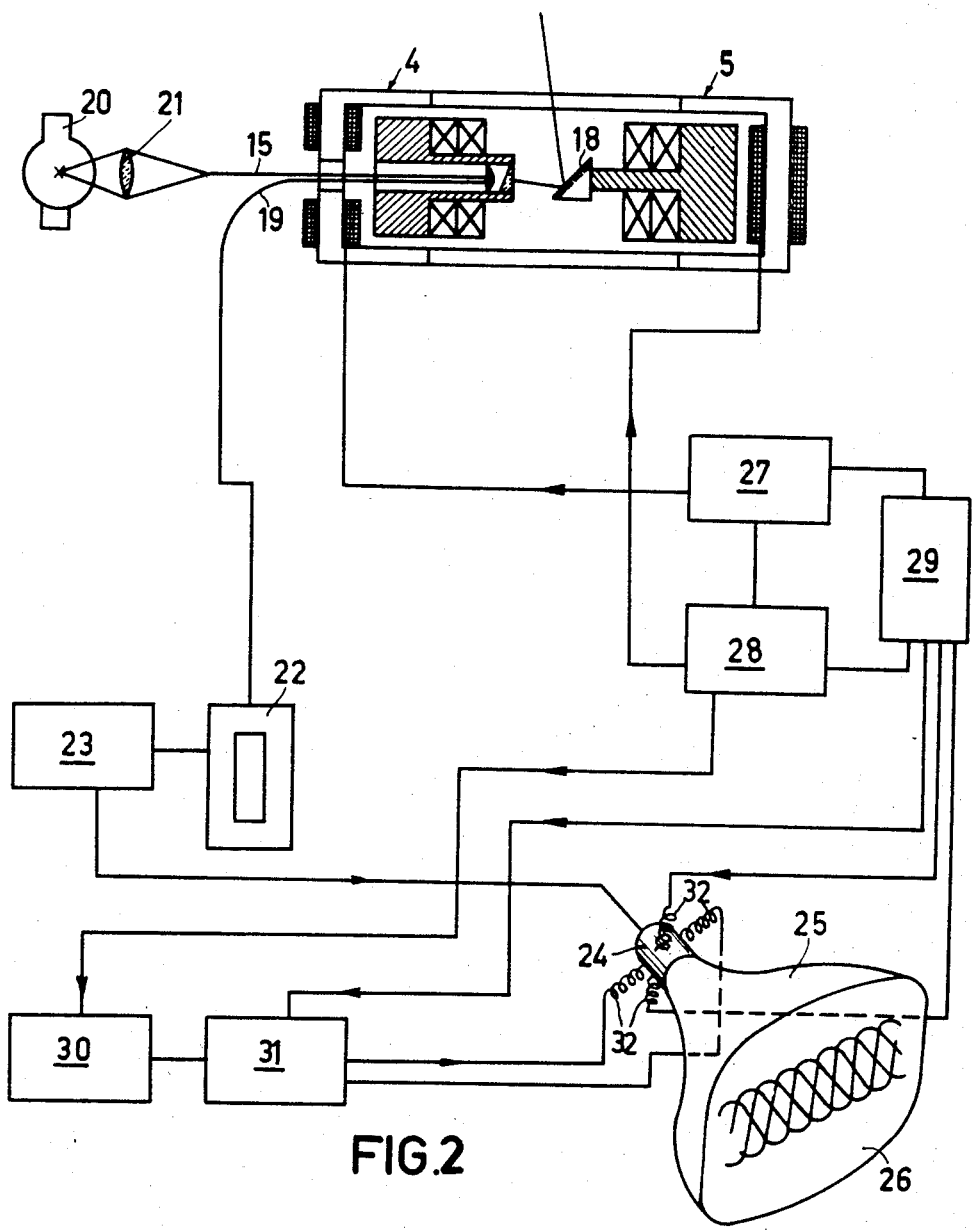
FIG. 2 shows a circuit diagram of the apparatus in which a camera with a scanning device according to the invention is used.

The endoscope shown in FIG. 1 comprises an envelope 1 of a type of insulating material which can readily be cleaned and disinfected and is at least partly transparent. The dimensions are, for example, length 3 cms, diameter of the cross section 5 mms. Connected to said envelope is a tube 2 in which are arranged both the optical conductor (or conductors) from fibres necessary for the transportation of light and the various tubes which serve for biopsy.

The figure shows on a considerably enlarged scale (approximately 10 times enlarged) a cross section in the longitudinal direction of the scanning device which is arranged inside the envelope. A part of the surface to be scanned which is substantially cylindrical is denoted by 3.

The scanning device comprises two oppositely located miniature motors 4 and 5 with stator pole pieces 6 and 7 which are connected by a transparent envelope 8 of glass or plastics so that the scanning beam which is diagrammatically denoted by 9 is transmitted to the surface 3. The two stator windings are denoted by 10 and 11. The rotors of the two miniature motors are denoted by 12 and 13 and they rotate in the same direction.

The shaft 14 of the rotor 12 is hollow so that light can be transmitted through the optical conductor 15—termed emitting conductor—to the focal plane of a convergent lens 16 which is secured in the shaft 14 and which, in the direction of the beam, is arranged in front of a first deflection element 17, for example, a prism. The element 17 is secured to the extremity of the shaft 14 and produces a small deflection of the light beam. The deflection angle is of the order of magnitude of 30°. The prism is rotated by the rotor 12.

The light beam refracted by the rotating prism 17 impinges upon a mirror 18 or a totally reflecting prism and is reflected to the part of the surface 3 to be investigated. The deflection angle lies between 60 and 120°.

The mirror 18 which encloses an angle of approximately 45° with the shaft is rotated by the rotor 13 which is arranged co-axially with the rotor 12.

The light diffused by the surface 3 after reflection by the mirror 18 and after refraction by the prism 17 is converged by the lens 16 in its focal plane and impinges upon the optical emitting conductor 15 and also on an optical conductor 19 —termed analysis conductor—which is located beside said conductor. In order to be able to receive on both optical conductors, a light spot of small dimensions will have to be formed at the extremities of the two conductors. Therefore the conductors terminate somewhat beyond the focus of the lens 16.

FIG. 2 shows a principle diagram of the whole apparatus required for the investigation in which a scanning device is used as described above. The light from a source 20 is concentrated by a condenser 21 and applied to the optical conductor 15. The light collected by the analysis conductor 19 is applied to the photocathode of a photomultiplier 22 which supplies an electric signal which is proportional to the intensity of the received light. The signal amplified by the amplifier 23 is applied to the Wehnelt cathode 24 of a cathode ray tube 25. The scanning of the cathode ray tube is adapted to the scanning of the surface to be investigated so that it is possible to reproduce an image of the said surface on the screen 26.

Figure 3A:
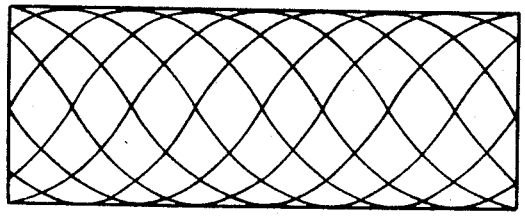
FIGS. 3a, 3b, 3c are developed views of cylinder surfaces which are scanned in three different manners in accordance with the relative speeds of the two motors.
Figure 3B:
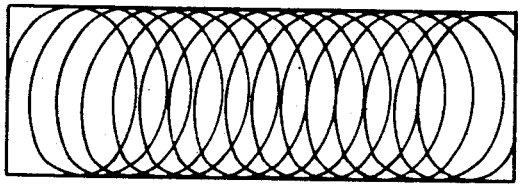
Figure 3C:

The three principal methods of scanning the surface to be investigated are shown in FIGS. 3a, 3b and 3c. The scanning of the cathode ray tube must be adapted to it as will be explained hereinafter, after the principal components of the circuit arrangement shown in FIG. 2 have been described. Two frequency generators 27 and 28 supply signals with frequencies $f_1$ and $f_2$, respectively, which are applied to the motors 4 and 5, respectively. The difference of the frequencies $f_1$ and $f_2$ is constant so that the mixing circuit 29 supplies an output signal with the constant frequency $f_1-f_2$ (if $f_1 > f_2$) or $f_2-f_1$ (if $f_2 > f_1$); the amplitude and the phase of this signal can be adjusted. The generator 28 (or 27 as the case may be) also controls a sawtooth generator 30 with suitable phase. An amplitude adder 31 enables the supply of a signal with controllable amplitude and phase, which signal is supplied by the mixing circuit 29, to the sawtooth signal supplied by the generator 30.

For the three principal methods of scanning the cylindrical surface denoted in FIGS. 3a, 3b and 3c, the scanning of the cathode ray tube is effected by energizing the deflection coils 32 of the cathode ray tube 25 as follows:

Horizontally, by a signal originating from the amplitude adder 31 and obtained by applying to a sawtooth voltage which is generated, for example at every revolution of the motor 4 or 5, a sinusoidal voltage which has a larger or smaller amplitude and a frequency which may be $f_1-f_2$ or $f_2-f_1$;

Vertically, by a sinusoidal voltage with suitable amplitude and phase and the frequency $f_1-f_2$ or $f_2-f_1$.

More accurately, for the scanning shown in FIG. 3a ($f_1$ small, $f_2$ large) the generation of the sawtooth voltage is started at every revolution of the motor 5 and the sinusoidal voltage has the frequency $f_2-f_1$.

For the scanning shown in FIG. 3b ($f_1$ large, $f_2$ small) the generation of the sawtooth voltage is started at every revolution of the motor 5 and the sinusoidal voltage has the frequency $f_1-f_2$.

For the scanning shown in FIG. 3c ($f_1-f_2$) the generation of the sawtooth voltage is started at every revolution of the motor 5 and the sinusoidal voltage has the frequency $f_2-f_1$.

The speeds of revolution of the motors 4 and 5 may be small, of the order of a few tens of revolutions per second, or large, of the order of a few thousand revolutions per second.

The invention is not restricted to the example described and variations may be provided without departing from the scope of the invention, in particular as regards the deflection elements (prism and mirror) and the type of light used which may alternatively be infrared and ultraviolet.

Alternatively, particular variations of the device may be provided in order to obtain a coloured picture. For example, the analysis conductor 19 is replaced by three conductors the adjacent extremities of which located in the focal plane of the lens 16 are juxtaposed while the other extremities are separated and connected to a filter and a detector, respectively, for each time one colour component of the light.

We claim:

1. A device for scanning a surface for a camera comprising means to transmit a narrow light beam along a given axis, first deflection means rotatable about said axis and positioned to intercept and deflect said light beam, said first deflection means having an angle of deflection of less than 45°, and second deflection means including a reflecting element in the path of and rotatable about said given axis and positioned to intercept and reflect said light beam deflected by said first deflection means, said second deflection means having an angle of deflection between 60° and 120°.

2. A device as claimed in claim 1, characterized in that the said first deflection element is a prism which is secured to one extremity of the hollow rotor shaft of a first motor and the second reflecting element is a flat mirror which is secured to one extremity of the rotor shaft of a second motor, co-axially with the first, the two said extremities being located opposite to each other, the optical axis of the mirror enclosing an angle with the shaft of the second motor.

3. A device as claimed in claim 2, characterized in that at least one optical emitting conductor and at least one optical analysis conductor are juxtaposed inside the hollow shaft of the first motor, one of the extremities of each conductor being located near the focal plane of a lens which is arranged inside the hollow shaft and is located between the optical conductors and the deflection element.